United States Patent

Perron et al.

Patent Number: 5,850,330
Date of Patent: Dec. 15, 1998

[54] ELECTRONIC TRIP DEVICE THAT DETECTS AN IMMINENT DROP OF THE POWER SYSTEM VOLTAGE AND COMPRISES A NUMERICAL PROCESSING CIRCUIT AND A THERMAL MEMORY

[75] Inventors: Patrick Perron, Moirans; Hong Nguyen, Grenoble, both of France

[73] Assignee: Schneider Electric SA, France

[21] Appl. No.: 902,002

[22] Filed: Jul. 29, 1997

[30] Foreign Application Priority Data

Aug. 30, 1996 [FR] France .................................. 96 10799

[51] Int. Cl.$^6$ ...................................................... H02H 5/04
[52] U.S. Cl. .................................. 361/103; 361/93; 361/87
[58] Field of Search .................................. 361/103, 93, 87

[56] References Cited

U.S. PATENT DOCUMENTS

| | | | |
|---|---|---|---|
| 3,643,130 | 2/1972 | Liska et al. ........................... | 317/40 R |
| 4,476,724 | 10/1984 | Kaneko et al. ........................ | 323/234 |
| 5,038,246 | 8/1991 | Durivage, III .......................... | 361/93 |
| 5,617,078 | 4/1997 | Durif et al. ............................ | 340/652 |
| 5,675,336 | 10/1997 | Hakkarinen ............................ | 341/135 |

FOREIGN PATENT DOCUMENTS

| | | |
|---|---|---|
| 326 334 A2 | 8/1989 | European Pat. Off. . |
| 578 958 A1 | 1/1994 | European Pat. Off. . |
| 678 962 A1 | 10/1995 | European Pat. Off. . |

*Primary Examiner*—Jeffrey A. Gaffin
*Assistant Examiner*—Kim N. Huynh
*Attorney, Agent, or Firm*—Parkhurst & Wendel

[57] ABSTRACT

The electronic trip device with a thermal memory including a capacitor and a charging resistor arranged in parallel. In normal operation, the capacitor is permanently charged by a supply voltage supplied by the power system to be protected. The trip device includes a processing circuit which performs tripping functions after calculation of a thermal value representative of the thermal state of the power system and detects an imminent drop of the supply voltage. When such a drop is detected, the processing circuit orders discharging of the capacitor until the voltage at the terminals of the capacitor is representative of the calculated numerical value.

5 Claims, 4 Drawing Sheets

ELECTRONIC TRIP DEVICE THAT DETECTS AN IMMINENT DROP OF THE POWER SYSTEM VOLTAGE AND COMPRISES A NUMERICAL PROCESSING CIRCUIT AND A THERMAL MEMORY

BACKGROUND OF THE INVENTION

The invention relates to an electronic trip device that includes: means for measuring the current flowing in an electrical power system to be protected, processing means connected to the measuring means, calculating a numerical value representative of the thermal state of the power system and/or of a load connected to the electrical power system and producing a tripping order when said numerical value exceeds preset thresholds and/or time delays, power supply means connected to the power system and supplying at least one supply voltage for the processing means, means for detecting an imminent drop of the supply voltage, and a thermal memory connected to the power supply means and comprising a capacitor in parallel with a discharging resistor, the processing means includes (i) means for applying to the terminals of the capacitor a voltage representative of the calculated numerical value in the event of an imminent drop of the supply voltage, and (ii) means for initializing calculation of the numerical value at a value representative of the voltage remaining at the terminals of the capacitor when the supply voltage is re-established. In recent electronic trip devices, a numerical processing circuit, generally microprocessor-based supplies a numerical value representative of the thermal state of the power system and/or of a load connected to the power system. This numerical value is calculated from measurement of the currents flowing in the power system to be protected and simulates heating and cooling of the load and/or power system. Known electronic trip devices are generally system-powered trip devices, that is to say powered by the power system to be protected. Notably after opening of a circuit breaker associated to the trip device, the trip device is no longer supplied. It is known to provide in the trip device an analog thermal memory formed by an RC type circuit comprising a capacitor connected in parallel with a resistor. In the event of a fault detected by the trip device, the capacitor of the thermal memory is charged to a value representative of the thermal state before tripping. After tripping, the capacitor discharges into the resistor of the thermal memory simulating cooling of the load and/or power system. When the circuit breaker is subsequently closed, the trip device, once more supplied by the power system, measures the voltage remaining at the terminals of the capacitor of the thermal memory and uses this value to initialize the numerical value representative of the thermal state.

Charging of the capacitor of the thermal memory calls on the supply voltage slightly before tripping, i.e. at the moment it is going to disappear. The object of the invention is to achieve a trip device wherein the thermal memory consumes little power at the moment of tripping.

SUMMARY OF THE INVENTION

This object is achieved by the fact that the thermal memory comprises an input permanently connected to an output of the supply means in such a way as to permanently charge the capacitor to a preset value in the presence of the supply voltage, the trip device comprising means for discharging the capacitor to a value representative of the calculated numerical value in the event of an imminent drop of the supply voltage.

According to a development of the invention, the thermal memory comprises a charging resistor connected in series with a diode and the capacitor between the supply voltage and ground.

According to another development of the invention, the thermal memory comprises means for analog-to-digital conversion of the voltage at the terminals of the capacitor, the means for discharging the capacitor comprising an electronic switch connected in parallel to the capacitor and comprising a control electrode, a closing signal being applied to said control electrode when an imminent drop of the supply voltage is detected so long as the calculated numerical value is lower than a numerical value representative of the voltage at the terminals of the capacitor.

BRIEF DESCRIPTION OF THE DRAWINGS

Other advantages and features will become more clearly apparent from the following description of different embodiments of the invention given as non-restrictive examples only and represented by the accompanying drawings in which.

DETAILED DESCRIPTION OF THE PREFERRED EMBODIMENT

Figure 1:
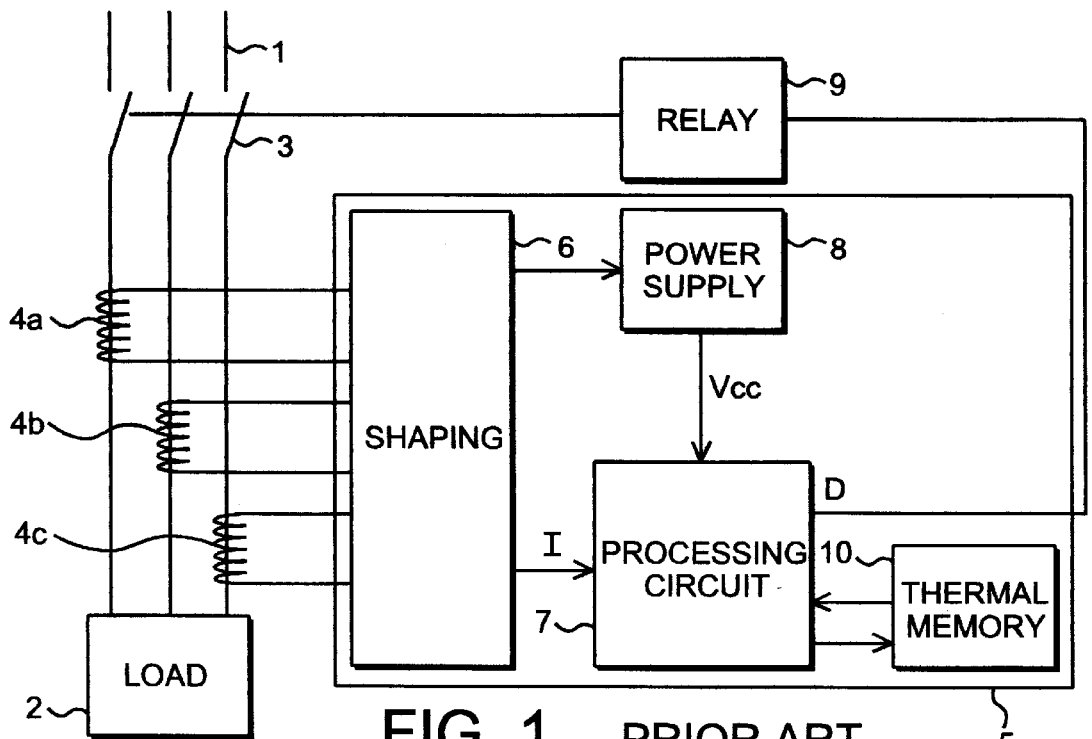
FIG. 1 illustrates, in schematic form, a trip device of known type.

FIG. 1 represents the block diagram of a circuit breaker of known type. An electrical power system 1 to be protected, composed of electrical conductors, supplies a load 2 by means of contacts 3. Current transformers 4a, 4b and 4c, respectively associated to the conductors of the power system 1, supply an electronic processing unit 5 with signals representative of the currents flowing in the conductors of the power system to be protected. These signals are applied, possibly by means of a shaping circuit 6, to the input of a processing circuit 7. A power supply circuit 8, also connected to the current transformers, supplies the processing circuit with a supply voltage Vcc. The processing circuit 7 performs various tripping functions and supplies a tripping signal D to an opening relay 9 of the contacts 3 when at least one of the measured currents exceeds a preset threshold for a preset time. Such a trip device can notably perform instantaneous, short delay, long delay and/or earth protection tripping, and/or phase unbalance functions.

As represented in FIG. 1, an analog thermal memory 10 is connected to the processing circuit 7.

Figure 2:
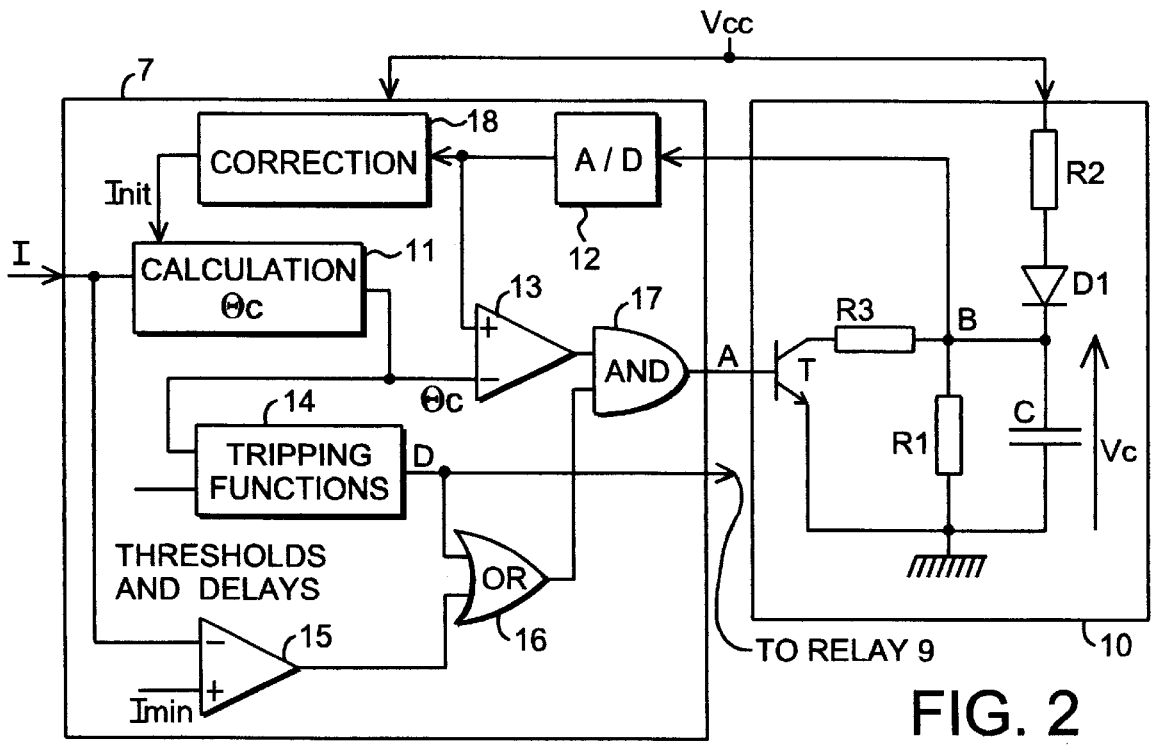
FIG. 2 represents a particular embodiment of the processing circuit and of the thermal memory of a trip device according to the invention.

FIG. 2 represents in greater detail a particular embodiment of the processing circuit 7 and of the thermal memory 10 of a trip device according to the invention.

The thermal memory 10 of FIG. 2 comprises an RC circuit formed by a capacitor C connected in parallel to a discharging resistor R1. The circuit R1C is connected in series with a charging resistor R2 and a diode D1, normally on, between the supply voltage Vcc and ground. In normal operation of the trip device, the voltage Vcc is present, appreciably constant, and the capacitor C is permanently charged at a voltage Vc close to Vcc.

The thermal memory 10 comprises a transistor T having a grounded emitter and a collector connected via a resistor R3 to a point B common to R1 and C and different from ground. The base, or control electrode, of the transistor T is connected to an output A of the processing circuit 7.

So long as the signal applied to A is zero, the transistor T is off and the capacitor C is charged by the supply voltage Vcc when the latter is present. If a logic signal which is not zero is applied to A, the transistor, connected in parallel to the capacitor C, is turned on and causes discharging of the capacitor C through the resistor R3. The processing circuit 7 limits this discharge to a value such that the voltage Vc is representative of a numerical value θc calculated by the processing circuit and representative of the thermal state of the load 2 and/or of the power system 1.

The functions of the processing circuit 7 necessary for understanding the invention are represented in block diagram form in FIG. 2. Signals I representative of the currents supplied by the measuring transformers are applied to a circuit 11 calculating the numerical value θc. This circuit supplies in known manner a numerical value θc representative of the thermal state of the load 2 and/or of the power system 1. The processing circuit comprises an analog-to-digital converter 12 whose input is connected to the point B. The converter 12 thus supplies on output digital signals representative of the voltage Vc at the terminals of the capacitor C of the thermal memory. A comparator 13 compares the output signals of the converter 12 and the value θc and supplies a binary logic signal which is zero if the value representative of Vc is lower than θc and which is not zero in the opposite case.

The output of the circuit 11 is also connected to the input of a circuit 14 performing the tripping functions which compares θc to threshold values and supplies the tripping signal D if θc exceeds at least one preset threshold for a preset time.

Production of a tripping signal D is representative of an imminent drop of the supply voltage Vcc. The signal D being applied to the relay 9 in fact causes opening of the contacts 3 and canceling of the currents flowing in the conductors of the power system 1. The supply circuit 8 is no longer supplied and its voltage Vcc then disappears after a certain time. The circuit 7 also detects the imminent drop of the supply voltage by monitoring the measured currents. A comparator 15 compares the signals I representative of the measured currents to a minimum current Imin and supplies a non zero output signal if the measured currents are all lower than Imin. In this case as well, the energy supplied to the supply circuit 8 is in fact insufficient to maintain the supply voltage Vcc at the required value. The output signals of the circuits 14 and 15 are applied to two inputs of a logic OR circuit 16. The circuit 16 consequently supplies a non zero output signal as soon as an imminent drop of the supply voltage is detected, whether this drop is due to detection of a fault resulting in sending of a tripping signal D or to detection of measured current values lower than Imin.

The outputs of the comparator 13 and of the logic circuit 16 are connected to two inputs of a logic AND circuit 17, whose output constitutes the output of the processing circuit. The signal applied to A is therefore zero as soon as one of the signals applied to the inputs of the logic circuit 17 is zero, i.e. in the absence of detection of an imminent drop of the supply voltage or when Vc is lower than θc, thus turning the transistor T off. On the other hand, if an imminent drop of the supply voltage has been detected and at the same time Vc is greater than θc, then the logic signal applied to the output A is not zero and turns the transistor T on. The transistor T then causes the capacitor C to be discharged until the voltage Vc at the terminals of the capacitor C is representative of θc. Then the output of the circuits 13 and 17 returns to zero, turning the transistor T off again. There is therefore servoing to the calculated value θc of the value of the voltage Vc at the terminals of the capacitor C of the thermal memory when an imminent drop of the supply voltage is detected. When the supply voltage disappears, the processing circuit 7 and the thermal memory 10 are no longer supplied and the voltage Vc simulates cooling of the load and/or power system.

When the supply voltage is re-established, the voltage Vc converted by the converter 12, applied to an initialization input of the circuit 11, acts as point of departure for calculation of θc.

Figure 4A:
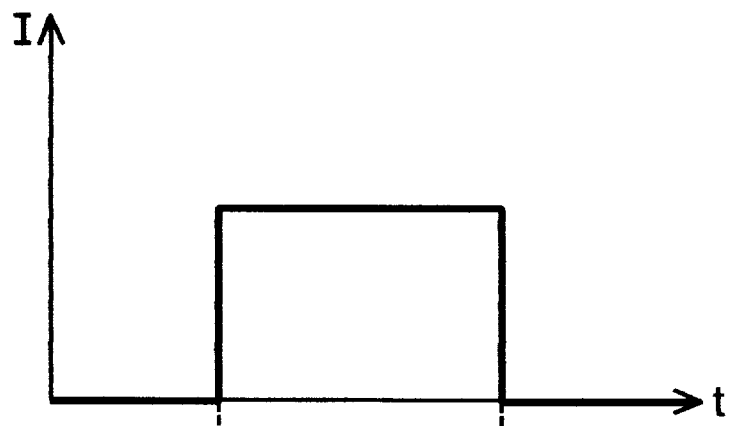
FIGS. 4a, 4b and 4c respectively illustrate the wave forms of the measured current I, of the voltage Vc at the terminals of the capacitor of the thermal memory and of the calculated numerical value θc, in a trip device according to the invention.
Figure 4B:
Figure 4C:
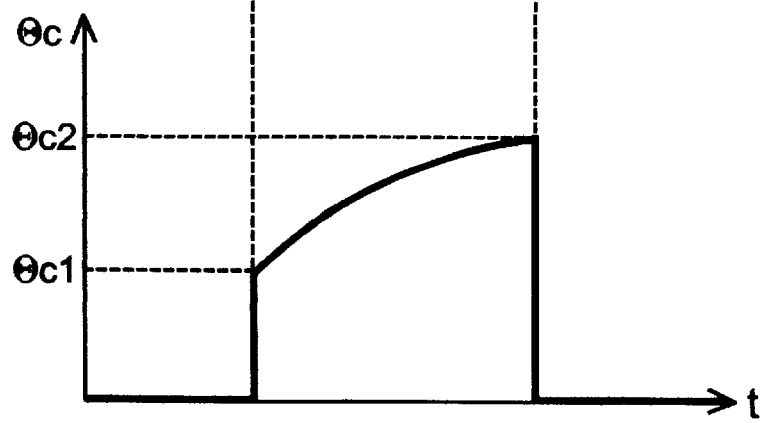

FIGS. 4a, 4b and 4c respectively illustrate the variations of I, Vc and θc versus time.

At a time t0, the contacts 3 are closed and the measured current I takes a non zero value greater than Imin. The voltage Vc at the terminals of the capacitor C is at a value Vc1 at the time t0. This voltage Vc1 is used by the processing circuit to initialize the numerical value θc at a corresponding value θc1. At the time t0, the power supply Vcc is re-established and the capacitor C charges. The voltage Vc reaches a value close to Vcc at a time t1. Charging of the capacitor takes place during a period of time (t0–t1) when the energy is available. In the presence of the current I (FIG. 4a) the value θc varies from θc1 at the time t0 to a value θc2 at a time t2 when the current I disappears. This disappearance may for example be due to manual opening of the contacts 3. This disappearance of the current I is detected by the processing circuit 7 (circuits 15, 16 and 17) which supplies at A a turn-on signal of T causing discharging of the capacitor C at the time t2. This high-speed discharging is interrupted as soon as the voltage Vc at the terminals of the capacitor C reaches a value Vc2 corresponding to the value θc2. The supply voltage Vc disappears, θc goes to 0 and the capacitor C discharges slowly through the resistor R1, simulating cooling of the load and/or power system.

Unlike charging of the capacitor C which is relatively long (t0–t1) and which requires energy, discharge of the capacitor at t2 is fast and does not consume any energy. This feature is particularly interesting for in the event of an imminent supply voltage outage it is important to use the energy still available wisely.

Figure 3:
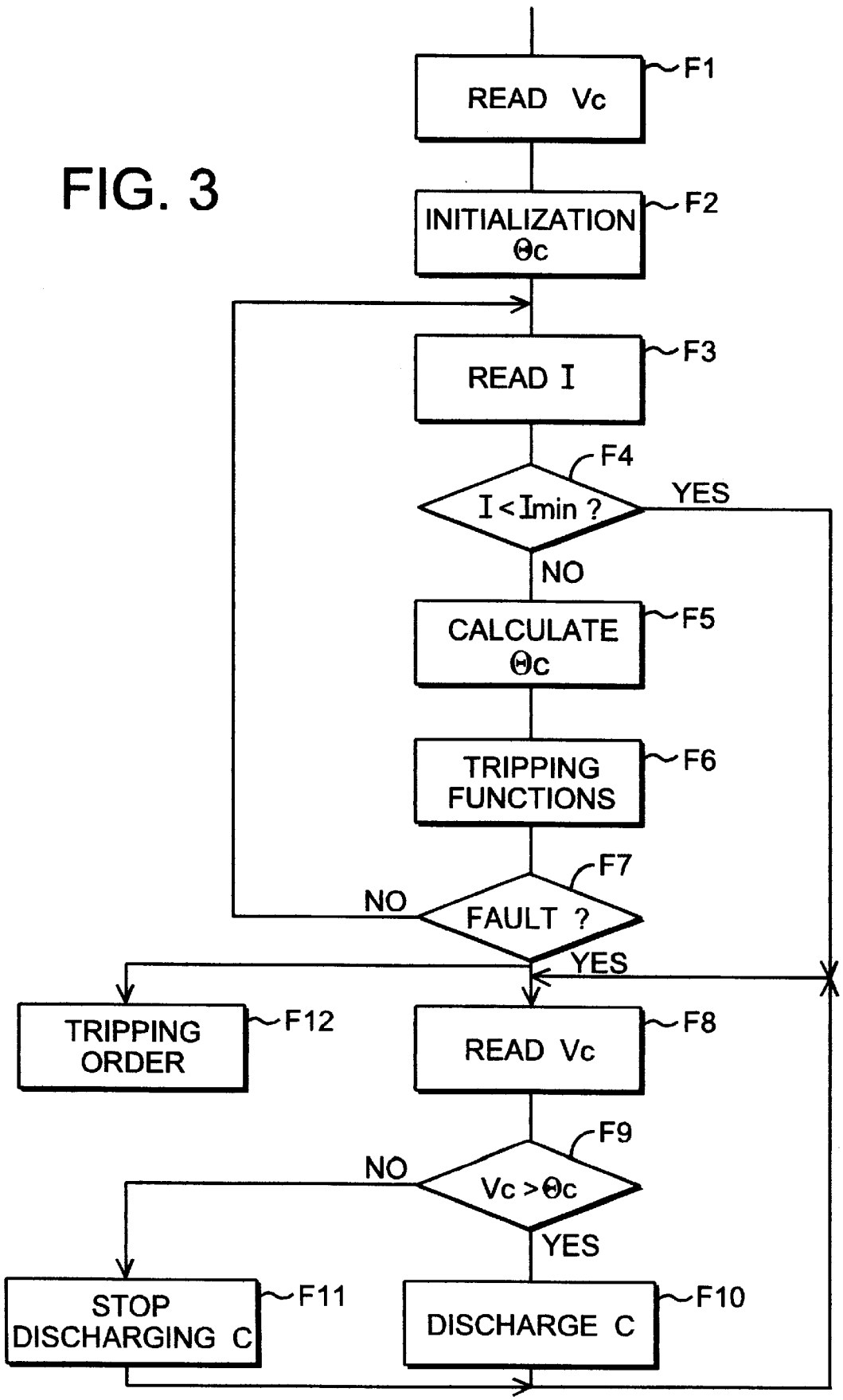
FIG. 3 illustrates a flowchart of operation of a particular embodiment of a trip device according to the invention.

FIG. 3 represents a flowchart able to be used by the processing circuit 7 when this circuit comprises a microprocessor performing the various functions represented in FIG. 2.

After closing of the contacts 3, as soon as the supply voltage Vcc is sufficient, the microprocessor of the processing circuit 7 reads the voltage Vc at a stage F1. Then, at a stage F2 it initializes θc according to the value of Vc. After a stage F3 of reading of the measured currents I, it compares the measured currents to the value Imin at F4. If the measured currents are sufficient, it calculates θc at F5 and then at F6 performs the various tripping functions. If no fault is detected, at F7 the processing circuit loops back to stage F3. If on the other hand the currents are lower than Imin (Yes output of F4) or if a fault is detected (Yes output of F7), the processing circuit goes on to a stage F8 of reading Vc. Then at F9 it compares Vc to θc. If Vc is greater than θc, it supplies at F10 a signal commanding discharge of C, before looping back to the input of stage F8. On the other hand, as soon as Vc is lower than θc it interrupts discharging of C at F11 before looping back to the input of FB. In addition, if a fault has been detected (Yes output of F7), a tripping order is produced at F12.

Figure 5A:
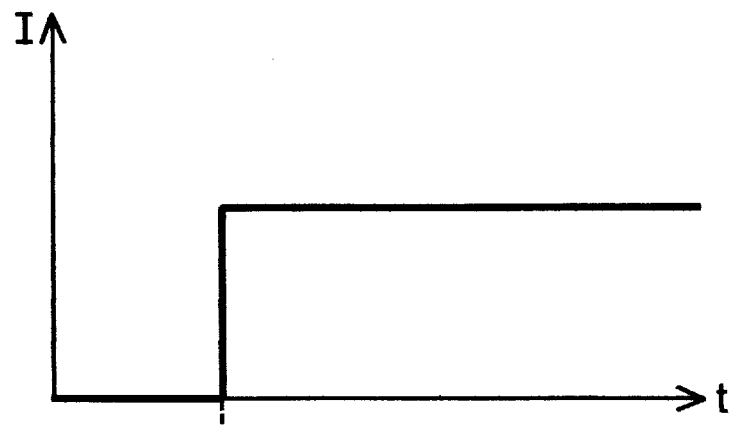
FIGS. 5a, 5b and 5c respectively illustrate, in enlarged form, the wave forms of I, Vc and θc, at the moment the circuit breaker associated to the trip device closes.
Figure 5B:
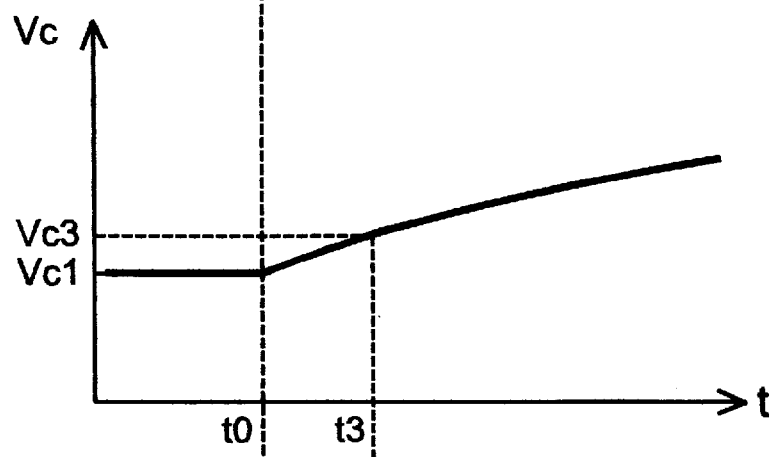
Figure 5C:
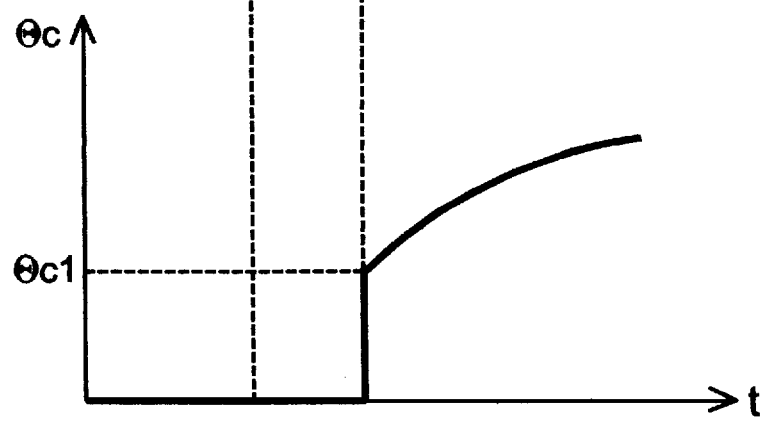

In practice, when the contacts 3 reclose, a certain time elapses between powering on of the processing circuit (at t0) and reading of the residual voltage Vc. This is represented, with a greatly enlarged scale, in FIGS. 5a, 5b and 5c. The capacitor C recharges right straight away the time t0. The voltage Vc thus goes from Vc1 at the time t0 to a higher voltage Vc3 at the time t3 when the processing circuit reads Vc to initialize θc. To improve the precision, a correction circuit 18 can be provided (FIG. 2) placed between the initialization input of the circuit 11 and the thermal memory, more precisely between the initialization input and the output of the converter 12. The charging time constant of the capacitor C being known, the correction circuit modifies the measured value Vc3 so as to supply a signal representative of Vc1 to the circuit 11. The initial value of θc is then θc1, corresponding to Vc1. As an example, the time period separating t0 from t3 may be a few milliseconds (3 or 4) and the difference between Vc3 and Vc1 about ten millivolts.

The invention is not limited to the particular embodiments represented in the figures. In particular, the supply circuit 8 can be supplied from current sensors distinct from the measuring transformers 4a, 4b and 4c. The current signals I applied to the input of the processing circuit 7 can be formed by distinct signals for each power system conductor or by signals corresponding to the maximum current flowing in the power system conductors.

The transistor T can be replaced by any electronic switch enabling the capacitor C to be short-circuited when a signal is applied to a control electrode. The transistor T can be located in the processing circuit 7 and not in the thermal memory 10.

We claim:

1. An electronic trip device comprising:

measuring means for measuring the current flowing in an electrical power system to be protected, processing means connected to the measuring means, the processing means calculating a numerical value representative of the thermal state of at least one of (i) the electrical power system and (ii) a load connected to the electrical power system and producing a tripping order when said numerical value exceeds preset thresholds and time delays, power supply means connected to the electrical power system and supplying at least one supply voltage for the processing means, means for detecting an imminent drop of the supply voltage, a thermal memory connected to the power supply means and comprising a capacitor in parallel with a discharging resistor, the processing means comprising means for applying to the terminals of the capacitor a voltage representative of the calculated numerical value in the event of an imminent drop of the supply voltage, and means for initializing calculation of the numerical value at a value representative of the voltage remaining at the terminals of the capacitor when the supply voltage is re-established, the thermal memory comprising an input permanently connected to an output of the power supply means to permanently charge the capacitor to a preset value in the presence of the supply voltage, and the trip device comprising means for discharging the capacitor to a value representative of the calculated numerical value in the event of an imminent drop of the supply voltage.

2. The trip device according to claim 1, wherein the thermal memory comprises a charging resistor connected in series with a diode and the capacitor between the supply voltage and ground.

3. The trip device according to claim 1, further comprising means for analog-to-digital conversion of the voltage at the terminals of the capacitor, the means for discharging the capacitor comprising an electronic switch connected in parallel to the capacitor and comprising a control electrode, a closing signal being applied to said control electrode when an imminent drop of the supply voltage is detected so long as the calculated numerical value is lower than a numerical value representative of the voltage at the terminals of the capacitor.

4. The trip device according to claim 1, wherein the means for detecting an imminent drop of the supply voltage comprises means for comparing the measured currents with a preset minimum value, and means for supplying a detection signal of an imminent drop of the supply voltage when the measured currents are lower than said minimum value or when a tripping order is produced.

5. The trip device according to claim 1, wherein the processing means comprises correction means connected between the thermal memory and an initialization input of the processing means.

* * * * *